Nov. 2, 1937.    C. R. PATON    2,097,466
MOTOR VEHICLE
Filed Nov. 29, 1933    3 Sheets-Sheet 1
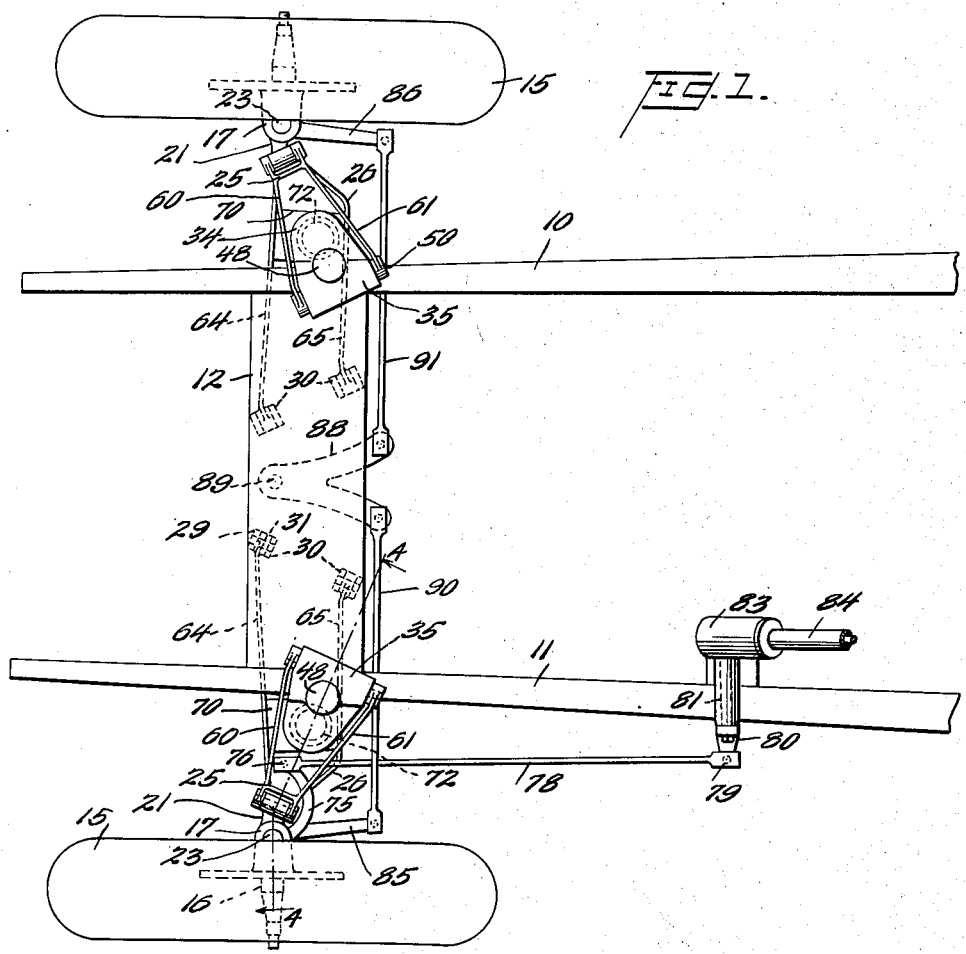
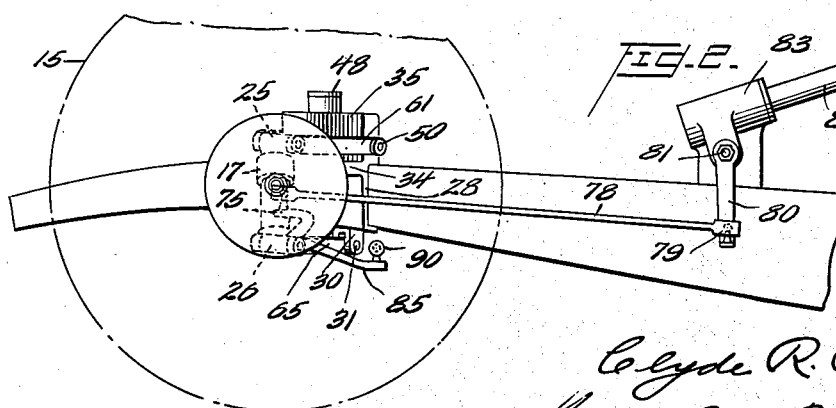
Inventor
Clyde R. Paton,
By Watson, Coit, Morse & Grindle
Attorney

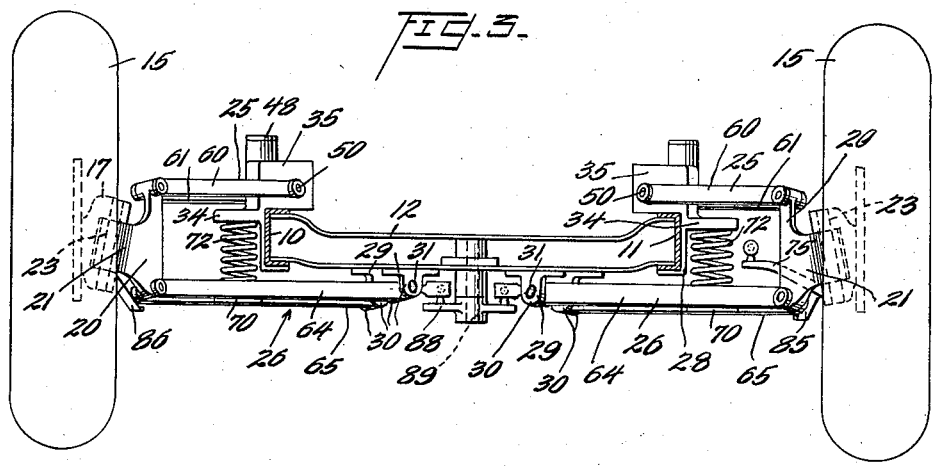
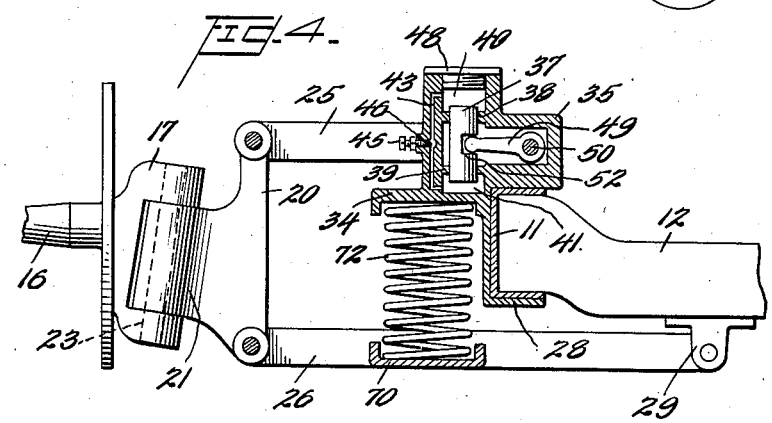
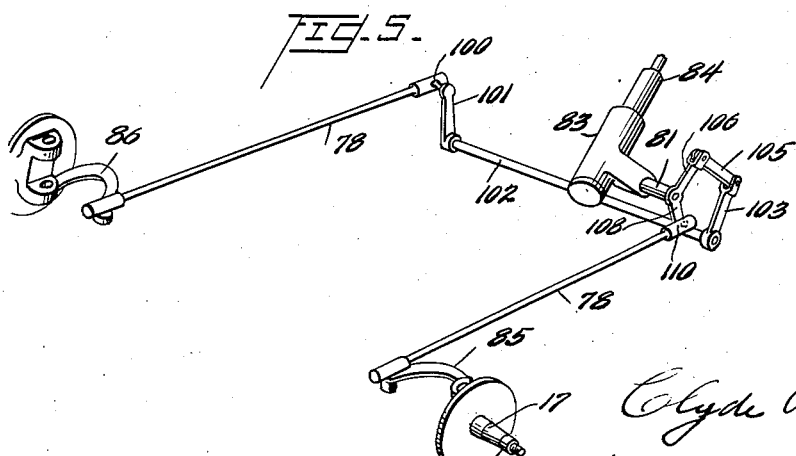

Nov. 2, 1937.    C. R. PATON    2,097,466
MOTOR VEHICLE
Filed Nov. 29, 1933    3 Sheets-Sheet 3
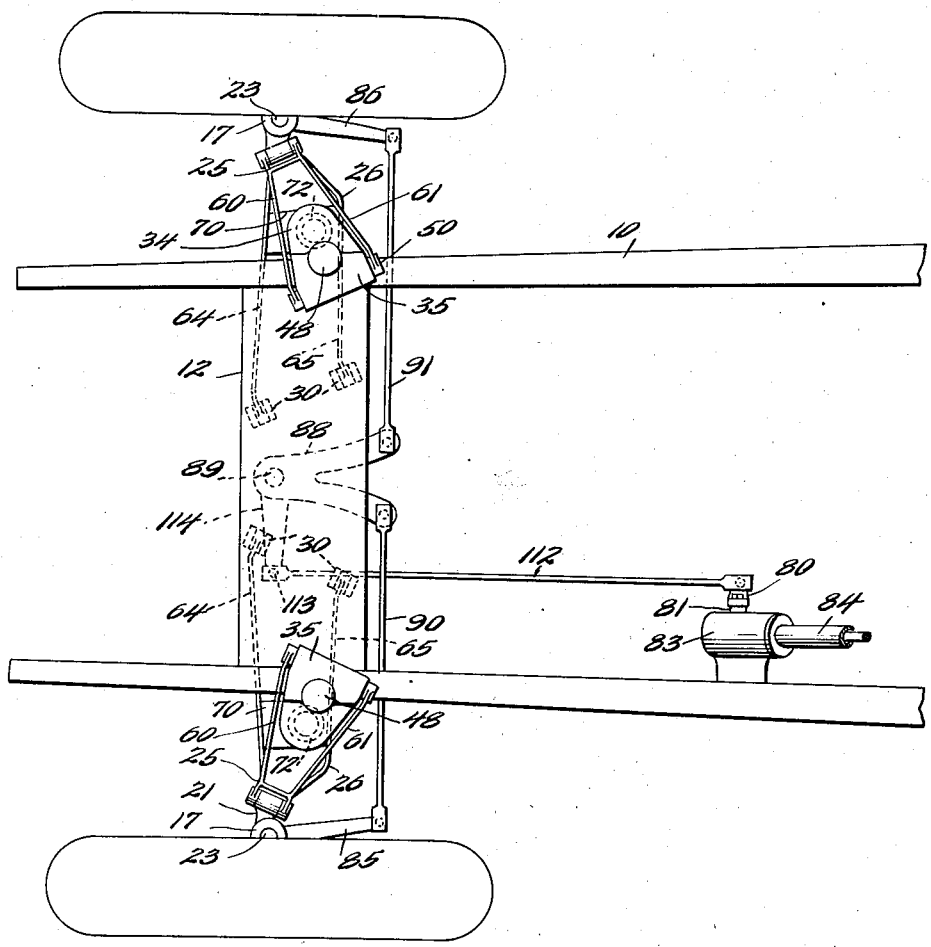

Patented Nov. 2, 1937

2,097,466

UNITED STATES PATENT OFFICE 2,097,466

MOTOR VEHICLE

Clyde R. Paton, Birmingham, Mich., assignor to Packard Motor Car Company, Detroit, Mich., a corporation of Michigan Application November 29, 1933, Serial No. 700,289

17 Claims. (Cl. 280—124)

This invention relates to motor vehicles and more particularly to improvements in vehicles of the type in which the road wheels are independently sprung from the vehicle frame. It is the principal object of the invention to provide a wheel suspension which will afford easy riding qualities under widely varying road conditions and which will render steering of the vehicle less difficult.

It is a feature of the invention that the point of engagement of the wheel tread with the ground is not displaced laterally to any material extent as the wheels rise and fall with respect to the frame in passing over an uneven road bed, thus eliminating unnecessary wear and scuffing of the tires which in some forms of independent wheel suspension has been found so serious as to cause stripping of the rubber tread from the body of the tire.

It is a further object of the invention to provide a wheel suspension employing coil springs for the purpose of reducing static friction, these springs having a low rate of action so that any up and down movement of the vehicle body will be relatively slow and therefore less objectionable to the occupants of the vehicle.

The invention contemplates the provision of steering mechanism which is so disposed with respect to the path of movement of the wheels as they rise and fall over an uneven road bed that the wheel movement does not effect improper relative displacement of the several parts of the steering mechanism; in other words, it is a feature of the invention that substantially perfect steering is obtained. The transmission of shock from the road wheels to the steering column and the steering hand wheel is thus avoided, and the steering movement of the road wheels may be accurately and positively controlled regardless of the nature of the road surface or the speed of the vehicle.

Further objects and features of the invention will be apparent from the following description taken in connection with the accompanying drawings, in which:

Figure 1 is a plan view of the forward portion of a motor vehicle frame illustrating one form of wheel suspension constructed in accordance with the principles of the invention;

Figure 2 is a side elevation of the arrangement shown in Figure 1;

Figure 3 is a front elevation corresponding to Figure 1;

Figure 4 is a section taken substantially on the line 4—4 of Figure 1;

Figure 5 is a perspective view illustrating a modification of the steering mechanism shown in Figure 1; and Figure 6 is a plan view corresponding to Figure 1 and embodying a modified form of steering mechanism.

In describing the invention, reference will be made to the drawings in which the invention has been illustrated as applied to a suspension for the front steerable road wheels of a vehicle. It will nevertheless be understood that certain features of the wheel suspension are equally as applicable to the rear road wheels and to road wheels which are not steerable. It will furthermore be appreciated that while the various elements disclosed in the drawings are described hereinafter by specific language in order to facilitate an understanding of the principles of the invention, no limitation of the invention is thereby intended, various alterations of the structural details such as fall within the scope of the invention being contemplated.

The supporting frame of the vehicle is illustrated conventionally as comprising the side frame members 10 and 11 and the cross frame member 12, the latter extending between and being rigidly secured to the side frame members in the usual manner. The road wheels 15 are carried on wheel spindles 16 which are in turn rigid with steering knuckles 17, each of the steering knuckles being supported for up and down movement as well as for steering movement in a substantially horizontal plane, a similar construction being employed at each side of the vehicle. Thus a wheel supporting link 20 is provided adjacent its lower end with a laterally extending wheel supporting bracket portion 21, preferably formed integrally with the link 20 and receiving the usual king pin 23 on which the steering knuckle 17 is journaled. The axis of the king pin is substantially vertical; in other works, conventional practice is followed, this axis being only slightly inclined so as to provide for the usual wheel camber.

The link 20 is pivotally connected at its upper end to a laterally extending link 25 and at its lower end to a second laterally extending link 26, the axes of these pivotal connections being nearly horizontal as explained more fully hereinafter. The links 25 and 26 are also pivotally connected for swinging movement with respect to the vehicle frame about nearly horizontal axes, a bracket 28 being bolted or otherwise secured to the associated side frame members 10 and 11 and affording pivotal support for the link 25, and a bracket 29 secured to the cross frame member 12 serving to pivotally support the link 26. It will be observed that the bracket 28 is provided adjacent its upper end with a horizontally extending flange 34, a portion of which extends over the side frame member, and that a shock absorber housing 35 is rigidly secured to or formed integrally with the flange 34, the upper link 25 being associated with this housing as hereinafter explained.

A conventional type of shock absorbing device is disposed within the housing 35. For instance, this device may comprise a piston 37 supported for sliding movement in substantially cylindrical guides 38 and 39 formed within the housing, the ends of the piston 37 projecting within chambers 40 and 41. The chambers 40 and 41 are normally filled with fluid, a passage 43 connecting these chambers to permit fluid to pass from one chamber to the other as the piston 37 is reciprocated. An element 45 threaded in the wall of housing 35 is provided with a valve portion 46 adapted to extend within and block the passage 43 to a greater or less extent for throttling the flow of fluid through the passage. Fluid is supplied to the system through an opening in the upper portion of the housing 35 normally closed by a cap 48. An arm 49 secured to a shaft 50 engages a recess 52 adjacent the central portion of the piston 37. The ends of the shaft 50 are journaled in and extend through the walls of the housing, and it will be observed that when this shaft is oscillated, the piston 37 will be reciprocated, rapid accelerative movement of the shaft 50 being opposed by the resistance offered to flow of fluid through the passage 43 between the chambers 40 and 41. The construction and mode of operation of the shock absorber is conventional and need not be explained in more detail, it being obvious that other types of shock absorber may be employed than that which is illustrated in the drawings.

The link 25, as shown in Figure 1 of the drawings, comprises two inwardly divergent arms 60 and 61, these arms being keyed or otherwise secured to the opposite ends of the shaft 50 exteriorly of the housing 35 whereby the piston 37 will be reciprocated as the link 25 is swung about the axis of the shaft 50. Similarly, the lower link 26 comprises two arms 64 and 65 which diverge toward the inner end of the link and which are pivoted at spaced points 31 to downwardly extending bosses 30 formed on the bracket 29. By means of this construction the necessary resistance to twisting of the links is obtained. For instance, when the vehicle brakes are applied, the inertia of the vehicle tends to turn the entire wheel assembly about the point of contact of the wheel tread with the ground, thus tending to rotate the supporting link structure in a counterclockwise direction as viewed in Figure 2 of the drawings. With the arrangement shown in the drawings, the points of pivotal support of the two arms of both the lower and upper links are spaced to a sufficient extent to resist this twisting moment, although it will be apparent that the construction may be modified so that only one of the links is of the two-armed or wish-bone type, the other link being pivoted to the frame at one point only.

The arms 64 and 65 of the lower link are connected by means of a transversely extending strut 70, preferably formed integrally with the two arms of the link, and a coil spring 72 is interposed between the strut 70 and the flange 34 on the bracket 28, this spring being initially compressed to an extent necessary to adequately support the vehicle load.

The operation of the mechanism thus far described will now be apparent. As either of the road wheels tends to rise or fall with respect to the vehicle on passing over an uneven road bed, the links 25 and 26 will be swung upwardly about their points of pivotal support on the vehicle frame. At the same time the coil spring 72 will be compressed, this spring offering resistance to upward movement of the wheels and tending to restore the wheels to their normal position with respect to the frame.

It will be observed that the link 25 is considerably shorter than the link 26. If these links were of the same length, a supporting parallelogram structure would be provided, and the link 20 would always remain parallel to its initial position regardless of the degree of upward movement of the wheel. Accordingly, any point on the link 20 or the members carried thereby would execute an arc about a corresponding point on the vehicle frame and would be moved inwardly as well as upwardly. Thus the wheel tread, on meeting an obstruction, would be carried inwardly and would be displaced laterally of the road bed, resulting in rapid wear of the tires. However, in the present construction employing a lower link of greater length, the vehicle wheel is not only moved bodily inward as it rises by reason of the parallel link arrangement, but because of the difference in the length of the links, the plane of the wheel is altered as the wheel rises, that portion of the wheel above the wheel spindle moving inwardly to a greater extent than the portion of the wheel below the wheel spindle. By suitable relative dimensioning of the links this inclination of the wheel as it rises may be utilized to compensate for the inward shifting of the tread portion, and the point of contact of the tread with the ground may be caused to rise substantially vertically and scuffing of the tires such as would occur if the links were of equal length is thereby avoided.

In the form of the invention shown in Figure 1 a steering knuckle arm 75, rigid with the steering knuckle 17 at the left-hand side of the vehicle and preferably formed integrally therewith, extends inwardly of the wheel assembly and is provided at 76 with the usual ball and socket connection to a steering drag link 78, the latter having in turn a similar ball and socket connection at 79 with a steering drop arm 80. The arm 80 is rigid with a shaft 81 which extends into the steering housing 83, the latter enclosing gearing operable from the usual steering column 84 and serving to rotate the shaft 81 in the customary manner. It is important in order to obtain accurate steering and to reduce to a minimum the tendency of the wheels to shimmy that undesired swinging movement of the wheels about their respective steering axes is avoided. Thus the forward end of the drag link 78 should, in swinging about the point of connection between the drag link and the steering drop arm 80, execute an arc of movement which substantially coincides with the arc of movement executed by the inner end of the steering knuckle arm 75. It will be observed from Figure 1 of the drawings that the axes of pivotal connection of the links 25 and 26 to the vehicle frame and to the link 20 are disposed at an acute angle with the vertical plane containing the longitudinal axis of the vehicle frame. In the construction shown in the drawings this angle is approximately 23°, although there are various factors affecting the inclination of these axes which may necessitate a greater or less inclination than that illustrated. It will also be observed that the inner and outer pivotal axes of the links are inclined downwardly toward the rear of the vehicle, the angle of inclination of these axes with a horizontal plane being illustrated as approximately 5° but being similarly capable of variation. Thus, by reason of the inclination of the axes about which the supporting links 25 and 26 swing, when either wheel rises or falls any member of the wheel assembly will be caused to execute an arc in a plane forming an acute angle with the plane containing the longitudinal axis of the vehicle. It will thus be perceived that the inner end of the steering knuckle arm 75 may be caused to execute an arc which will conform substantially to an arc which the forward end of the steering drag link is capable of executing about its point of connection 79 with the steering drop arm 80.

Stated differently, it is found that the inner end of the steering knuckle 75 executes within certain limits of movement a substantially circular arc in a plane perpendicular to the axes of the inner ends of the links 25 and 26 and passing through the member in question. If this substantially circular arc be conceived as constituting a portion of the base circle of a right cone, the cone axis being parallel to the axes of the links 25 and 26 and the rear pivot point 79 of the drag link 78 lying at the cone apex, it is quite obvious that the drag link will correspond in position to an element of the cone and that the forward end of the drag link will describe an arc similar to that executed by the member to which it is connected. In this manner the drag link 78 may be permitted to swing freely with the wheel assembly during the rising and falling movements of the latter with no resulting tendency to displace the wheel assembly about its steering axis, and disturbances of the steering mechanism likely to induce shimmy are thereby materially reduced or eliminated.

It will of course be appreciated that there are several factors which affect in varying degree the curvature and the location of the arc executed by the inner end of the steering knuckle arm 75. Among these may be mentioned the position occupied by the inner end of this arm, the relative length of the wheel supporting links 25 and 26, and the angular disposition of the inner and outer pivotal axes of these links with respect to horizontal and vertical planes. However, when these factors are coordinated in such a manner that the steering knuckle arm describes an arc which does not deviate materially (within the normal range of movement of the road wheels in rising and falling) from an arc of a circle, it is possible to locate the drag link 78 in the manner hereinbefore described to secure perfect steering. Alternatively, if it be desired for convenience or from practical considerations to locate the rear end of the drag link at some general position with respect to the vehicle frame, variation of the several factors referred to may permit the wheel suspension to be accommodated accordingly. It may be mentioned that in the illustrated embodiment of the invention the wheel supporting links 25 and 26 are shown in the normal or mid position thereof as defining substantially parallel planes, and the drag link 78 and the planes of the wheel supporting links form substantially equal angles with a horizontal plane. The present invention nevertheless contemplates such departure from this disposition of the parts as may be found desirable, and under some circumstances the links 25 and 26 may extend either downwardly or upwardly from the inner pivotal axes thereof in the normal or mid position and may define planes which intersect at an acute angle.

It may also be pointed out that while the axes of the wheel supporting links in the preferred form of the invention extend inwardly and forwardly toward the longitudinal axis of the vehicle, the direction of these axes might be altered or even reversed. Thus the axes might be directed inwardly toward the rear of the vehicle, in which case it would be necessary to alter the relative position of the steering drag link. Thus if the axes of the wheel supporting links were so reversed, the drag link might be extended forwardly of the wheel suspension or might extend transversely of and toward the rear of the vehicle, it being only necessary that this link be so located as to constitute in effect an element of a cone defined as hereinbefore explained. It may be observed, however, that the inclination of the axes of the links proposed in the drawings accompanying this application is advantageous for the reason that the wheels are permitted to yield slightly on meeting an obstruction, each wheel as it rises having a component of movement toward the rear of the vehicle, this effect resulting from the inclination of the axes for the wheel supporting links, both with respect to the longitudinal vertical plane of the vehicle and with respect to a horizontal plane.

An arm 85 is formed integrally with the steering knuckle arm 75, and an arm 86 is rigidly secured to or formed integrally with the steering knuckle 17 at the right side of the vehicle. A bell crank lever 88 is pivoted about a substantially vertical axis at 89 to the cross frame member 12 adjacent the center of the latter, the arms of the bell crank lever having articulated connection with tie rods 90 and 91, the latter having similar articulated connection with the arms 85 and 86 respectively. By means of this construction the two road wheels are caused to execute similar steering movements in response to displacement of the drag link 78.

The points of pivotal connection for the tie rods 90 and 91 are shown in the drawings as disposed substantially in the plane defined by the axes of the respective lower links 26 and each rod will partake generally of the same movement when the wheels rise and fall as the associated lower link. Thus if either rod be swung about the point of connection thereof to the lever 88, the outer end of the rod will describe an arc substantially coinciding with the path of movement of the inner end of the adjacent steering knuckle arm so that displacement of either road wheel about its steering axis is avoided.

It will be observed here that the principle whereby the steering drag link 78 and the steering knuckle arm 75 are caused to describe the same arc in space is also applied to the cross connecting linkage between the two road wheels. Thus the rearward end of the arm 85 describes, within the usual limited range of rising and falling movement of the wheel, a substantially circular arc which may be considered as defining the periphery of the base of a hypothetical right circular cone, since the arc in question is described in a single plane perpendicular to the axes of the supporting links 25 and 26. The point of pivotal connection between the tie rod 90 and the associated arm of the bell crank lever 88 may then be so located as to lie on the axis of or coincide with the apex of the cone, in which event the tie rod 90 will correspond to an element of the cone and the outer end thereof will describe the periphery of the cone base when the rod is swung about its point of pivotal support.

Referring now to Figure 5 of the drawings, it will be seen that a modified form of steering construction is disclosed employing two steering drag links 78, these steering drag links being connected respectively to the steering knuckle arms 85, 86 which are in turn carried by the steering knuckles 17 as described with reference to the form of the invention shown in Figure 1. The rear end of the steering drag link 78 at the right-hand side of the vehicle is provided with an articulated connection 100 to an arm 101 rigid with a shaft 102 extending transversely across the vehicle frame and carrying at its opposite end an arm 103. The arm 103 is connected by means of a link 105 to an arm 106 which is rigid with the steering shaft 81, and a second arm 108 rigid with the steering shaft 81 is provided at 110 with an articulated connection to the drag link 78 at the left-hand side of the vehicle.

The points of articulated connection 100 and 110 at the rear ends of the drag links 78 are located as described with reference to the modification shown in Figure 1 of the drawings. In other words, these points are so disposed that the forward ends of the drag links will execute arcs of movement conforming substantially to the arcs executed by the steering knuckle arms 85 and 86 and perfect steering is thereby obtained. It is of course understood that the leverage of the linkage connecting the steering shaft 81 with each of the drag links 78 is such that the same amplitude of movement will be imparted to each of the drag links for a given rotational movement of the steering shaft.

Figure 6 corresponds precisely with Figure 1 with the exception that the drag link 78 and the associated arm 75 of the form of the invention shown in Figure 1 have been eliminated. Similar reference characters have been employed to designate the corresponding parts in the two figures and it is therefore unnecessary to refer in detail to the general construction.

In lieu of the drag link 78 employed in Figure 1, a link 112 is provided, this link having an articulated connection at 113 with an arm 114 formed rigidly with or secured to the bell crank lever 88. The link 112 is pivoted at its rear end to the steering drop arm 80 as at 81, it being observed that the arrangement will necessitate the employment of worm gearing within the housing 83 which is of the proper hand to impart steering movement to the vehicle wheels in the right direction as the steering hand wheel is operated.

With this construction the steering apparatus which operates the bell crank lever 88 is carried on the vehicle frame and thus partakes of no displacement as the vehicle wheels rise and fall. While the wheel supporting links 25 and 26 are illustrated in this form of the invention as in the form shown in Figure 1 of the drawings as extending forwardly, that is to say, as pivoted on axes directed outwardly and rearwardly of the vehicle frame, it is quite obvious that these links could be directed rearwardly, in which event the same principles would be employed in establishing the proper cooperative relationship between the cross tie rods 90 and 91, the bell crank lever 88, and the arms 85 and 86. Thus the arms 85 and 86 would, with either direction of inclination of the axes of the wheel supporting links, describe arcs defining imaginary cones by means of which the points of connection between the bell crank lever 88 and the rods 90 and 91 could be located.

The construction hereinbefore described is characterized by a complete absence of any tendency of the front road wheels to shimmy since each road wheel rises and falls substantially independently of the other, and the development of the condition of synchronous vibration between the two wheels is thus avoided so far as possible. It will also be observed that it is possible to materially reduce the static friction of the wheel suspension system by employing coiled springs, thereby decreasing the tendency of the frame to move upwardly as either road wheel meets an obstruction. At the same time proper resistance to relative movement of the road wheels and the frame to prevent synchronous up and down movement of the frame is afforded by the shock absorbing device which may be so designed as to resist accelerative downward movement of the road wheels with respect to the frame and to offer little resistance to upward movement of the wheels.

The suspension of the vehicle by coiled springs offers the further advantage that the natural frequency of the springs may be reduced to a minimum without reducing the strength of the springs to a value less than that required to adequately support a heavy vehicle body. Thus undesirably rapid movement of the vehicle body on the springs is avoided, it having been found that a relatively slow movement is much less annoying to occupants of the vehicle.

Having thus described the invention, what is claimed as new and desired to be secured by Letters Patent is:

1. In a motor vehicle, the combination with a vehicle frame, of a pair of road wheels disposed adjacent one end of the frame at opposite sides thereof, means supporting each of said wheels on said frame for rising and falling movement with respect to said frame independently of the other wheel, said means consisting of two pairs of laterally extending wheel supporting links, the links of each pair being pivotally mounted at their inner ends on said frame for swinging movement about separate parallel axes, the axis of one of the links of each pair being disposed above the axis of the other link of the pair, said axes being inclined at an acute angle with respect to the vertical plane containing the longitudinal axis of the vehicle and being inclined with respect to a horizontal plane, members carrying said road wheels and having pivotal connections with the links of each pair, and means for yieldingly resisting upward pivotal movement of the links.

2. In a motor vehicle, the combination with a vehicle frame, of a pair of road wheels disposed adjacent one end of the frame at opposite sides thereof, means supporting each of said wheels on said frame for rising and falling movement with respect to said frame independently of the other wheel, said means comprising two pairs of laterally extending wheel supporting links, the links of each pair being pivotally mounted at their inner ends on said frame for swinging movement about separate parallel axes, the axis of one of the links of each pair being disposed above the axis of the other link of the pair, said axes being inclined at an acute angle with respect to the vertical plane containing the longitudinal axis of the vehicle and being inclined with respect to a horizontal plane, at least one link of each pair being pivotally mounted on said frame at a plurality of points spaced in the axis of pivotal movement of the link, members carrying said road wheels and having pivotal connections with the links of each pair, and means for yieldingly resisting upward pivotal movement of the links.

3. In a motor vehicle, the combination with a vehicle frame, of a pair of steerable road wheels disposed adjacent one end of the frame at opposite sides thereof, means supporting each of said wheels on said frame for rising and falling movement with respect to said frame independently of the other wheel, said means comprising two pairs of laterally extending wheel supporting links, the links of each pair being pivotally mounted at their inner ends on said frame for swinging movement about separate parallel axes, the axis of one of the links of each pair being disposed above the axis of the other link of the pair, said axes being inclined at an acute angle with respect to the vertical plane containing the longitudinal axis of the vehicle, the axes on opposite sides of the vehicle frame converging toward the forward end of the frame, and being inclined with respect to a horizontal plane, at least one link of each pair being pivotally mounted on said frame at a plurality of points spaced in the axis of pivotal movement of the link, steering knuckles supporting said road wheels for steering movement about substantially vertical axes, each of said knuckles being carried by the links of the associated pair, a longitudinally extending steering drag link operatively connected at the forward end thereof with one of said knuckles, and an operating member movably supported on said frame and having an articulated connection with said drag link, the location of said articulated connection and the length of said drag link being such that the forward end of the drag link describes an arcuate path about the point of connection of the drag link and the associated operating member conforming substantially to the arcuate path of movement of that part of the steering knuckle to which the drag link is connected, whereby undesired movement of the wheels about the steering axes thereof is avoided.

4. In a motor vehicle, the combination with a vehicle frame, of a pair of road wheels disposed adjacent one end of the frame at opposite sides thereof, means supporting each of said wheels on said frame for rising and falling movement with respect to said frame independently of the other wheel, said means consisting of two pairs of laterally extending wheel supporting links, the links of each pair being pivotally mounted at their inner ends on said frame for swinging movement about separate parallel axes, the axis of one of the links of each pair being disposed above the axis of the other link of the pair, said axes being inclined at an acute angle with respect to the vertical plane containing the longitudinal axis of the vehicle and being inclined with respect to a horizontal plane, members carrying said road wheels and having pivotal connections with the links of each pair, and means for yieldingly resisting upward pivotal movement of the links, that link of each pair having the uppermost axis being shorter than the other link of the pair, whereby the wheel tread is not materially altered as the road wheels rise and fall.

5. In a motor vehicle, the combination with a vehicle frame, of a pair of road wheels disposed adjacent one end of the frame at opposite sides thereof, means supporting each of said wheels on said frame for rising and falling movement with respect to said frame independently of the other wheel, said means consisting of two pairs of laterally extending wheel supporting links, the links of each pair being pivotally mounted at their inner ends on said frame for swinging movement about separate parallel axes, the axis of one of the links of each pair being disposed above the axis of the other link of the pair, said axes being inclined at an acute angle with respect to the vertical plane containing the longitudinal axis of the vehicle and being inclined with respect to a horizontal plane, members carrying said road wheels and having pivotal connections with the links of each pair, and a coil spring acting between one link of each pair and said frame for resisting upward pivotal movement of the links.

6. In a motor vehicle, the combination with a vehicle frame, of a pair of road wheels disposed adjacent one end of the frame at opposite sides thereof, means supporting each of said wheels on said frame for rising and falling movement with respect to said frame independently of the other wheel, said means consisting of two pairs of laterally extending wheel supporting links, the links of each pair being pivotally mounted at their inner ends on said frame for swinging movement about separate parallel axes, the axis of one of the links of each pair being disposed above the axis of the other link of the pair, said axes being inclined at an acute angle with respect to the vertical plane containing the longitudinal axis of the vehicle and being inclined with respect to a horizontal plane, members carrying said road wheels and having pivotal connections with the links of each pair, a coil spring acting between one link of each pair and said frame for resisting upward pivotal movement of the links, and hydraulic shock absorbing devices acting between said links and said frame for damping the movement of said links.

7. In a motor vehicle, the combination with a vehicle frame, of a pair of road wheels disposed adjacent one end of the frame at opposite sides thereof, means supporting each of said wheels on said frame for rising and falling movement with respect to said frame independently of the other wheel, said means consisting of two pairs of laterally extending wheel supporting links, the links of each pair being pivotally mounted at their inner ends on said frame for swinging movement about separate parallel axes, the axis of one of the links of each pair being disposed above the axis of the other link of the pair, said axes being inclined at an acute angle with respect to the vertical plane containing the longitudinal axis of the vehicle and being inclined with respect to a horizontal plane, a shock absorbing device carried by said frame including an operating shaft therefor, said shaft constituting the pivotal support for one of said links, whereby rising and falling movement of the links serves to operate said shock absorbing device, members carrying said road wheels and having pivotal connections with the links of each pair, and means for yieldingly resisting upward pivotal movement of the links.

8. In a motor vehicle, the combination with a vehicle frame, of a pair of steerable road wheels disposed adjacent one end of the frame at opposite sides thereof, means supporting each of said wheels on said frame for rising and falling movement with respect to said frame independently of the other wheel, said means consisting of two pairs of laterally extending wheel supporting links, the links of each pair being pivotally mounted at their inner ends on said frame for swinging movement about separate parallel axes, the axis of one of the links of each pair being disposed above the axis of the other link of the pair, said axes being inclined at an acute angle with respect to the vertical plane containing the longitudinal axis of the vehicle and being inclined with respect to a horizontal plane, members carrying said road wheels for steering movement about substantially vertical axes and having pivotal connections with the links of each pair, the axes of pivotal connection at opposite ends of the link being substantially parallel, means for yieldingly resisting upward pivotal movement of the links, and means connecting said road wheels for conjoint steering movement, said last named means comprising an element pivoted on said frame intermediate said road wheels, and steering tie rods having articulated connection with said element and with the respective road wheels.

9. In a motor vehicle, the combination with a vehicle frame, of a pair of steerable road wheels disposed adjacent one end of the frame at opposite sides thereof, means supporting each of said wheels on said frame for rising and falling movement with respect to said frame independently of the other wheel, said means comprising two pairs of laterally extending wheel supporting links, the links of each pair being pivotally mounted at their inner ends on said frame for swinging movement about separate parallel axes, the axis of one of the links of each pair being disposed above the axis of the other link of the pair, said axes being inclined at an acute angle with respect to the vertical plane containing the longitudinal axis of the vehicle, the axes on opposite sides of the vehicle frame converging toward the forward end of the frame, and being inclined with respect to a horizontal plane, at least one link of each pair being pivotally mounted on said frame at a plurality of points spaced in the axis of pivotal movement of the link, steering knuckles supporting said road wheels for steering movement about substantially vertical axes, each of said knuckles being carried by the links of the associated pair, a pair of longitudinally extending drag links, each of said drag links being operatively connected at the forward end thereof with one of said knuckles, operating members movably supported on opposite sides of said frame, each of said operating members having an articulated connection with one of said drag links, the relative disposition and length of the parts being such that the forward end of each of said drag links describes an arcuate path about the point of connection of the drag link and the associated operating member conforming substantially to the arcuate path of movement of that part of the steering knuckle to which the drag link is connected, whereby undesired movement of the wheels about the steering axes thereof is avoided, and means connecting said operating members for conjoint movement.

10. In a motor vehicle, the combination with a vehicle frame, of a pair of road wheels disposed adjacent one end of the frame at opposite sides thereof, means supporting each of said wheels on said frame for rising and falling movement with respect to said frame independently of the other wheel, said means consisting of two pairs of laterally extending wheel supporting links, the links of each pair being pivotally mounted at their inner ends on said frame for swinging movement about separate parallel axes, the axis of one of the links of each pair being disposed above the axis of the other link of the pair, said axes being inclined with respect to a horizontal plane, members carrying said road wheels for steering movement about substantially vertical axes, each of said members extending between and pivotally connected with the outer ends of the links of one pair, that link of each pair having the uppermost axis being shorter than the other link of the pair, a longitudinally extending steering drag link having at its forward end an articulated connection with one of said wheels, an operating element carried by said frame and pivotally connected with the rearward end of said drag link, the point of connection between said drag link and element lying substantially in the apex of an imaginary right circular cone of which the arc traversed by that portion of the wheel to which the drag link is connected substantially defines the periphery of the base, whereby undesired movement of the wheels about the steering axes thereof is avoided.

11. In a motor vehicle, the combination with a vehicle frame, of a steerable road wheel assembly, means supporting said wheel assembly on said frame for rising and falling movement with respect thereto, said means comprising a pair of laterally extending wheel supporting links, said links being pivotally mounted at their inner ends on said frame for swinging movement about parallel vertically spaced axes, said axes being inclined at an acute angle with respect to the vertical plane containing the longitudinal axis of the vehicle, and being inclined with respect to a horizontal plane, a member carrying said road wheel assembly for steering movement about a substantially vertical axis and having pivotal connections with said links, and steering mechanism for said wheel assembly, said mechanism comprising a steering lever carried by said frame, gearing for swinging said lever, an arm carried by said wheel assembly, and a substantially longitudinally extending steering drag link pivotally connected to said arm and said lever, the point of pivotal connection between said drag link and said steering lever lying substantially in the apex of an imaginary right circular cone of which the arc described by said arm during rising and falling movement of the wheel assembly substantially defines the periphery of the base, whereby undesired movement of the wheels about the steering axes thereof is avoided.

12. In a motor vehicle, the combination with a vehicle frame, of a pair of road wheels disposed adjacent one end of the frame at opposite sides thereof, and means supporting each of said wheels on said frame for rising and falling movement with respect to said frame independently of the other wheel, said means comprising members having articulated connection with said frame and said wheels about axes inclined at an acute angle with respect to the vertical plane containing the longitudinal axis of the vehicle and inclined with respect to a horizontal plane.

13. In a motor vehicle, the combination with a vehicle frame, of a pair of road wheels disposed adjacent one end of the frame at opposite sides thereof, means supporting each of said wheels on said frame for rising and falling movement with respect to said frame independently of the other wheel, said means comprising two pairs of laterally extending wheel supporting links, the links of each pair being pivotally mounted at their inner ends on said frame for swinging movement about separate parallel axes, the axis of one of the links of each pair being disposed above the axis of the other link of the pair, said axes being inclined at an acute angle with respect to the vertical plane containing the longitudinal axis of the vehicle and being inclined with respect to a horizontal plane, members carrying said road wheels and having pivotal connections with the links of each pair, and means for yieldingly resisting upward pivotal movement of the links.

14. In a motor vehicle, the combination with a vehicle frame, of a pair of road wheels disposed adjacent one end of the frame at opposite sides thereof, and means supporting each of said wheels on said frame for rising and falling movement with respect to said frame independently of the other wheel, said means comprising members having articulated connections with said frame and said wheels, the articulated connections of at least one of said members being such that the said member may execute swinging movement in a plane transverse to the vehicle frame and inclined rearwardly and upwardly to form an acute angle with the vertical.

15. In a motor vehicle, the combination with a vehicle frame, of a pair of road wheels disposed adjacent one end of the frame at opposite sides thereof, and means supporting each of said wheels on said frame for rising and falling movement with respect to said frame independently of the other wheel, said means comprising members having articulated connections with said frame and said wheels, the articulated connections of at least one of said members defining pivotal axes which extend downwardly and rearwardly to form an acute angle with a horizontal plane.

16. In a motor vehicle, the combination with a vehicle frame, of a pair of road wheels disposed adjacent one end of the frame at opposite sides thereof, means supporting each of said wheels on said frame for rising and falling movement with respect to said frame independently of the other wheel, said means comprising two pairs of laterally extending wheel supporting links, the links of each pair being pivotally mounted at their inner ends on said frame for swinging movement about separate axes, the axis of one of the links of each pair being disposed above the axis of the other link of the pair and being inclined downwardly and rearwardly to form an acute angle with a horizontal plane, members carrying said road wheels and having pivotal connections with the links of each pair, and means for yieldingly resisting upward pivotal movement of the links.

17. In a motor vehicle, the combination with a vehicle frame, of a pair of road wheels disposed adjacent one end of the frame at opposite sides thereof, means supporting each of said wheels on said frame for rising and falling movement with respect to said frame independently of the other wheel, said means comprising two pairs of laterally extending wheel supporting links, the links of each pair being pivotally mounted at their inner ends on said frame for swinging movement about separate axes, the axis of one of the links of each pair being disposed above the axis of the other link of the pair and being inclined downwardly and rearwardly at an acute angle with respect to a horizontal plane, members carrying said road wheels and having pivotal connections with the links of each pair, and means for yieldingly resisting upward pivotal movement of the links, that link of each pair having the uppermost axis being shorter than the other link of the pair, whereby the wheel tread is not materially altered as the road wheels rise and fall.

CLYDE R. PATON.